July 12, 1927.  1,635,699
E. J. R. BEATTEY
METHOD OF MAKING OPHTHALMIC MOUNTINGS
Filed June 17, 1922  2 Sheets-Sheet 1
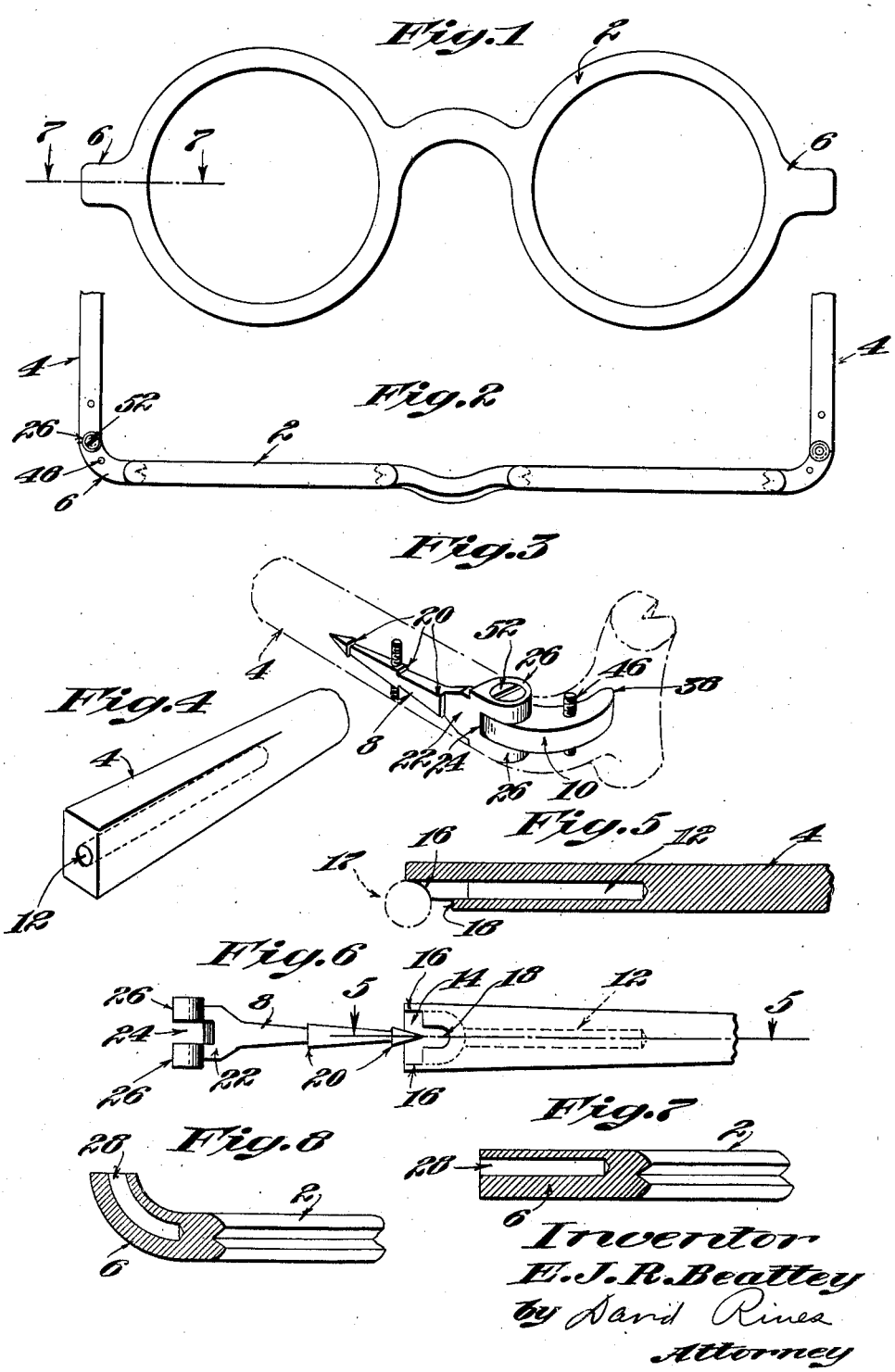

July 12, 1927. 1,635,699
E. J. R. BEATTEY
METHOD OF MAKING OPHTHALMIC MOUNTINGS
Filed June 17, 1922 2 Sheets-Sheet 2
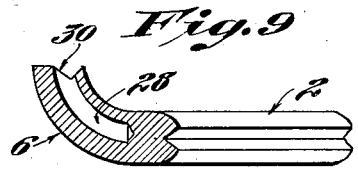
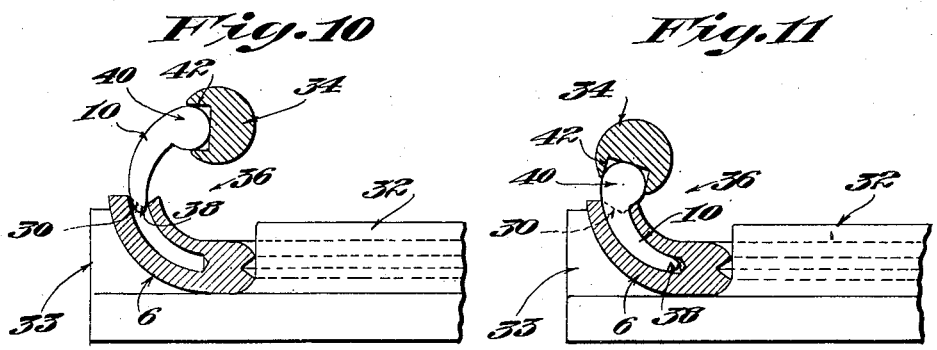
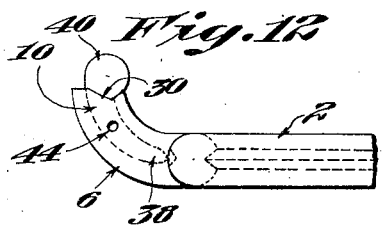
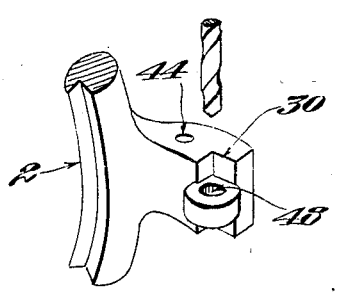
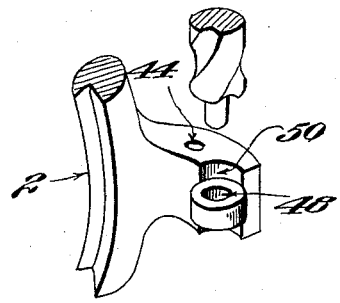
Inventor
E. J. R. Beattey
by David Rines
Attorney Patented July 12, 1927.

1,635,699

UNITED STATES PATENT OFFICE.

EARLE J. R. BEATTEY, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

METHOD OF MAKING OPHTHALMIC MOUNTINGS.

Application filed June 17, 1922. Serial No. 568,901.

The present invention relates to methods of making ophthalmic mountings, particularly mountings of the non-metallic type.

The chief object of the invention is to improve upon present-day hinge connections between the fronts and the temples of ophthalmic mountings of the above-described character. Other objects will appear hereinafter.

In the accompanying drawings, Fig. 1 is a front elevation of an ophthalmic mounting constructed according to a preferred embodiment of the present invention; Fig. 2 is a plan of the same, with parts broken away; Fig. 3 is a perspective view showing the preferred hinge connection of the present invention; Fig. 4 is a similar view of the forward end of a temple before assembly with its hinge element; Fig. 5 is a longitudinal section of the same, illustrating a step in the manufacture, the section being taken upon the line 5—5 of Fig. 6, looking in the direction of the arrows; Fig. 6 is a view showing a hinge element about to be assembled with the temple; Fig. 7 is a section taken as upon the line 7—7 of Fig. 1, looking in the direction of the arrows, illustrating a step in the manufacture of the preferred front of the present invention; Figs. 8, 9, 10 and 11 are similar views illustrating additional steps; Fig. 12 is a similar view, showing a hinge element driven into place in an end piece of the front; and Figs. 13 and 14 are perspective views illustrating further steps in the manufacture.

Non-metallic mountings of the character illustrated in the present invention are usually constituted of a front 2 and temples 4. The temples are hinged at their forward ends to end pieces 6 of the front 2. The metal hinge elements employed according to the present invention are shown at 8 and 10, the former being driven into the forward end of the temple 4, and the latter into an end piece 6.

The temple is made by first drilling or otherwise boring a hole 12 longitudinally into the forward end of a non-metallic element that is to constitute the temple 4. The non-metallic material is then countersunk at 14 near the free end of the bore 12, and a portion of the wall of the countersink is cut away, as by means of a drill 17, and a portion 18 is also cut away. See Figs. 5 and 6.

The hinge element 8 is then driven into the bore. This hinge element 8 is provided with one or more barbed portions 20 and a forked enlarged portion 22. The barbed portions bite into the walls of the bore 12 and the enlarged portion becomes seated in the countersink 14. The non-metallic material along the walls of the bore 12 yields momentarily while the hinge element 8 is driven into position, then flows back behind the barbs 20, securely locking the hinge element in place. The portion 22 of the hinge element 8 is enlarged, as illustrated, to give greater strength to the hinge element, which would otherwise become weakened by the cutting away of the material at 24 between the prongs 26.

The front 2 is initially blanked out of sheet celluloid, the ends 6 lying at this time, in the same plane with the body of the front, as shown in Fig. 7. Holes 28 are at this time drilled or otherwise bored, one in each end piece, after which the end piece is bent into the position shown in Fig. 8. The bore 28 is thus caused to assume a curved form, as shown. The tip of the end piece is then transversely notched at 30, after which the hinge element 10, curved to the shape of the now-curved bore 28, is driven into this bore. The front 2 and the end piece 6 must at this time be held rigidly against displacement, and the hinge element must be accurately driven. To this end, the machine shown diagrammatically in Figs. 10 and 11 may profitably be employed.

This machine comprises a cylindrical lug 32 over which a rim of the front 2 is placed, and a die 33 shaped to conform to the curved end piece 6 and against which the curved end piece 6 rests. A die 34 is mounted to rotate about an axis 36 that passes through substantially the center of the arc of the curved end piece 6. The tip 38 of the hinge element 10 is placed in the free end of the curved bore 28; the head 40 of the hinge element 10 is received in a recess 42 of the die 34; and the die 34 is then rotated about the axis 36 to drive the hinge element 10 accurately into the curved bore 28.

The hinge element 10, so driven into place, will stay in place; but it is preferred to employ additional securing means. To this end, a hole 44 is drilled through the end piece 6 and the hinge element 10, the hole 44 is tapped, and a screw 46 is tapped into and through the tapped hole. The screw may previously be dipped into a suitable solvent which, when hardened, will cause the screw to become firmly cemented in place against the tapped walls of the hole 44. The head and the foot of the screw 46 are sheared or otherwise cut flush with the end piece.

Before the hole 44 is drilled, the hinge element 10 may be drilled at 48, and the portion of the end piece 6 near the drilled hole 48 may be skived at 50 to receive the prongs 26 of the hinge element 8. The hole 48 may be used as a guide for the skiving and for the drilling of the hole 44, thus insuring that the latter shall pass properly through the hinge element 10. The hinge element 10 is then hinged between the prongs 26 by a pintle 52.

A mounting constructed in accordance with the present invention is most efficient, the parts being nicely adjusted, and it is of pleasing appearance, no metal parts being visible when the mounting is viewed from the front.

Many modifications will occur to persons skilled in the art, and all such are intended to be embraced within the appended claims.

What is claimed as new is:

1. The method of making an article of the class described that comprises holding a non-metallic article with a curved bore against displacement, the bore being closed on all sides except at one end, driving into the bore through the said end, while the article is so held, a non-yielding element curved to the shape of the bore but thicker than the cross dimension of the bore, and causing the element to travel during the driving action along the path of the curved bore.

2. The method of making an ophthalmic mounting that comprises boring a non-metallic mounting to produce a bore closed on all sides except at one end, bending the mounting to cause the bore to assume a curved form, holding the mounting against displacement, driving into the bore through the said end, while the article is so held, a metal element curved to the shape of the bore but thicker than the cross dimension of the bore, and causing the element to travel during the driving action along the path of the curved bore.

3. The method of making an ophthalmic mounting that comprises boring an end piece of a non-metallic mounting to produce a bore closed on all sides except at one end, bending the end piece to cause the bore to assume a curved form, holding the mounting against displacement, driving into the bore through the said end, while the article is so held, a metal hinge element curved to the shape of the bore but thicker than the cross dimension of the bore, causing the element to travel during the driving action along the path of the curved bore, and inserting a securing member through the end piece and the hinge element.

4. The method of making an ophthalmic mounting that comprises boring an end piece of a non-metallic mounting to produce a bore closed on all sides except at one end, bending the end piece to cause the bore to assume a curved form, holding the mounting against displacement, driving into the bore through the said end, while the article is so held, a metal hinge element curved to the shape of the bore but thicker than the cross dimension of the bore, causing the element to travel during the driving action along the path of the curved bore, drilling a hole through the end piece and the hinge element, tapping the hole, threading a securing screw into and through the tapped hole, and cutting the ends of the screw flush with the end piece.

In testimony thereof, I have hereunto subscribed my name this 9th day of June, 1922.

E. J. R. BEATTEY.